United States Patent
Golovin et al.

(10) Patent No.: US 6,177,907 B1
(45) Date of Patent: Jan. 23, 2001

(54) METHOD AND APPARATUS FOR DETERMINING AN ANGLE OF ARRIVAL OF A TRANSMITTED SIGNAL IN A COMMUNICATION SYSTEM

(75) Inventors: Edward S. Golovin, Buffalo Grove; Louay Jalloul, Palatine; Stephen W. Henderson, Chicago; Jeff L. Pfeil, Bartlett, all of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/409,548

(22) Filed: Sep. 30, 1999

(51) Int. Cl.[7] ........................................ G01S 3/02
(52) U.S. Cl. ............................... 342/458; 342/457
(58) Field of Search .................... 342/463, 465, 342/457, 458

(56) References Cited

U.S. PATENT DOCUMENTS

| | | | |
|---|---|---|---|
| 5,285,209 | * | 2/1994 | Sharpin et al. ........................ 342/424 |
| 5,334,984 | * | 8/1994 | Akaba ................................... 342/149 |
| 5,689,274 | * | 11/1997 | Rose ...................................... 342/417 |
| 5,724,047 | * | 3/1998 | Lioio et al. ............................ 342/442 |
| 5,999,129 | * | 12/1999 | Rose ...................................... 342/394 |
| 6,047,192 | * | 4/2000 | Maloney et al. ....................... 455/456 |

* cited by examiner

Primary Examiner—Thomas H. Tarcza
Assistant Examiner—Dao L. Phan
(74) Attorney, Agent, or Firm—Kenneth A. Haas

(57) ABSTRACT

A method and apparatus for determining an angle-of-arrival (AOA) of the prompt ray at an adjacent sector of a base station is provided. High precision parameter estimates from a main sector location searcher (501) are provided to an adjacent sector location searcher (502) in order to enhance the accuracy of the parameter estimates generated by the adjacent sector location searcher (502). Main sector time-delay and phase estimates may be used as estimates for the adjacent sector time-delay, and phase estimates to increase the coherent averaging window within the adjacent sector location searcher, and hence to increase the accuracy of the amplitude estimation from the adjacent sector location searcher.

13 Claims, 6 Drawing Sheets

METHOD AND APPARATUS FOR DETERMINING AN ANGLE OF ARRIVAL OF A TRANSMITTED SIGNAL IN A COMMUNICATION SYSTEM

FIELD OF THE INVENTION

The present invention relates generally to communication systems, and more particularly, the present invention relates to a method and apparatus for determining the angle of arrival of a transmitted signal in a communication system.

BACKGROUND OF THE INVENTION

It is well known that a remote unit's location within a communication system may be determined using an amplitude difference-based angle of arrival estimation (AD-AOA). Such a method of AD-AOA location using average energy values for the received prompt rays is described in commonly assigned U.S. Pat. No. 5,786,791, METHOD FOR DETERMINING AN ANGLE OF ARRIVAL OF A SIGNAL TRANSMITTED BY A REMOTE UNIT IN A COMMUNICATION SYSTEM, by Bruckert, the disclosure of which is hereby expressly incorporated herein by reference. Other methods are described in U.S. Pat. No. 4,636,796, RADIO DIRECTION FINDING SYSTEM, by Imazeki and U.S. Pat. No. 4,833,478, AUTOMATIC DIRECTION FINDER ANTENNA ARRAY, by Nossen, the disclosures of which are hereby expressly incorporated herein by reference. Briefly, these later methods determine the angle of arrival of a signal transmitted from a remote unit by analyzing the amplitude differences of signals received at multiple antennas at a base site.

In accordance with known methods of locating a remote unit transmitter in code division multiple access (CDMA) based communication systems, a high precision estimation of the prompt ray time-delay and amplitude is required. High precision estimation of the received signal amplitude at the main sector can be achieved by the location searcher with the main sector base station based on the method for prompt ray extraction with coherent integration, deconvolution and non-coherent integration procedures. However, the low received chip-to-noise ratio Ec/No at the adjacent sector (7 to 15 dB less than at the main sector) makes it impossible to use the location searcher at the adjacent sector to provide accurate AOA estimate.

Higher precision estimations may be obtained at the adjacent sector using the methods and apparatus described in the commonly assigned U.S. pat. application METHOD AND APPARATUS FOR ESTIMATING A CHANNEL METRIC by Henderson, et al. filed of even date herewith, the disclosure of which is hereby expressly incorporated by reference. Still, low signal-to-noise ratio (SNR) conditions can hamper the effectiveness of the location searcher in determining the AOA even given a higher precision estimation.

Therefore, there is a need for an improved method and apparatus for AD-AOA estimation in the presence of low signal-to-noise ratio (SNR) conditions at the adjacent sector location searcher.

DETAILED DESCRIPTION OF THE DRAWINGS

Accurate estimations of the angle-of-arrival (AOA) of the prompt ray at an adjacent sector of a base station are provided by herein described methods and apparatus according to preferred embodiments of the invention. The invention encompasses a method of estimating an angle-of-arrival in which high precision parameter estimates from a main sector location searcher are provided to an adjacent sector location searcher in order to enhance the accuracy of the parameter estimates generated by the adjacent sector location searcher. In a preferred implementation of the method, the main sector time-delay estimates are used as time-delay offset estimates for the adjacent sector amplitude estimation process. In an alternate preferred implementation of the method, main sector time delay and channel phase (hence frequency) estimates are used to increase the coherent averaging window within the adjacent sector location searcher to in turn increase the accuracy of the amplitude estimation from the adjacent sector location searcher.

In a preferred apparatus, a main sector location searcher and an adjacent sector location searcher within a base station of a communication system are coupled to communicate parameter estimates. In a preferred implementation of the apparatus, an output of the main sector location searcher time-delay estimator is coupled to the adjacent sector location searcher to provide a dispreading time offset estimate. In an alternate preferred implementation of the apparatus a channel estimation result from the main sector location searcher is multiplied with the dispreading signal in the adjacent location searcher.

Figure 1:
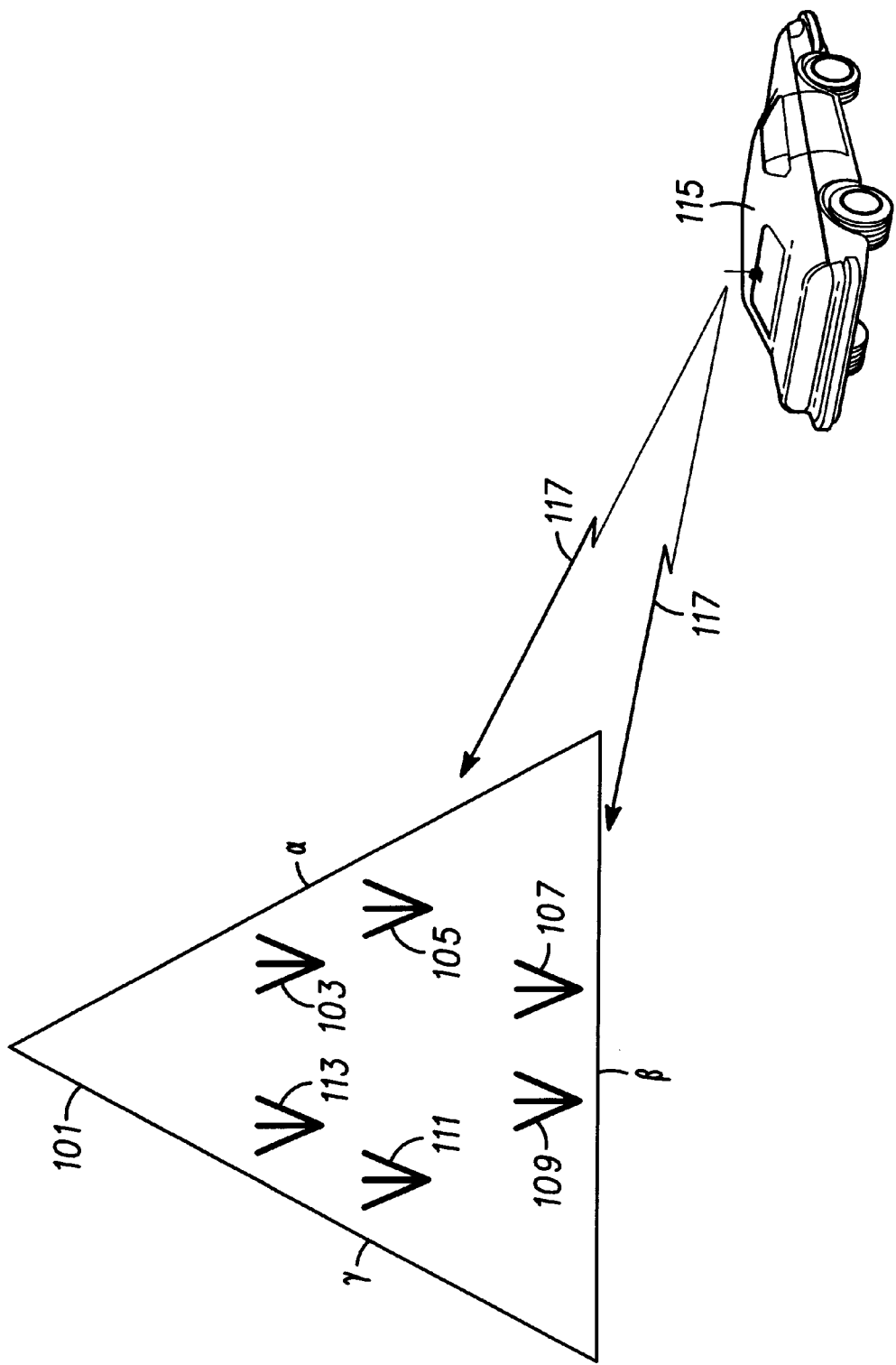
FIG. 1 is a schematic illustration of a communication system.

Referring to the communication system shown in FIG. 1, a sectorized base site 101 includes a plurality of receive antennas 103–113 which receive signal 115 transmitted from remote unit 117. As is evident, antennas 103 and 105 in a main sector "α" will receive signal 117 at a different angle of arrival than antennas 107 and 109 in an adjacent sector "β". Because of this, antennas in the main sector will also receive signal 117 at a different amplitude than antennas in the adjacent sector. It is the difference in received amplitudes of signal 117 at various antennas that is utilized in determining the angle of arrival of signal 117. Adjacent is not used herein to refer to the next physically adjacent sector or sectors to the main sector. Instead, adjacent is used to refer to sectors that are not otherwise aligned with the main sector from an azimuth perspective whether or not physically located next to the main sector.

Figure 2:
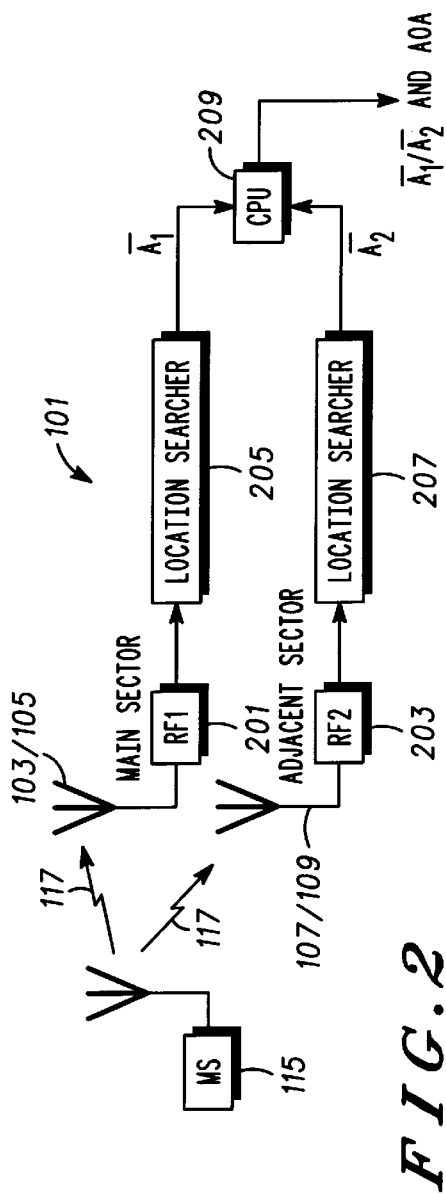
FIG. 2 is a block diagram illustration of a communication system incorporating a location searcher.

As shown in FIG. 2, each of the main sector and the adjacent sector include an RF front end 201 and 203 coupled to antennas 103 and 105 and to antennas 107 and 109, respectively. Each RF front end 201 and 203 operate as is well known to operate on the received signals and to generate baseband I, Q signals which in turn are communicated, respectively, to a main sector location searcher 205 and an adjacent sector location searcher 207.

The output of each of the searchers 205 and 207 is an estimated amplitude of the signal 117 arriving at the respective antennas. These estimates are fed to an AOA computer 209 from which the AD-AOA estimate is computed.

The gain of the antennas 103–109 is directional and varies as a function of the azimuth and elevation angles. Thus, two adjacent sectors antennas with angular diversity can be represented as a converter of azimuth angle-of-arrival to the amplitude difference and can be used to determine the line of bearing between the remote unit 115 and the base station 101. Applying Gaussian curve approximation to the horizontal and vertical patterns of the two adjacent sectors antennas (antennas 103/105 and antennas 107/109) the amplitudes of the received signals $A_1$ and $A_2$ can be expressed by:

$$A_1 = A_{m1} \exp\{-[(\phi-\phi_1)^2/0/72B^2_{h1}] = [a \tan(h_1/r)^2/0.72B^2_{v1}\} \quad (1)$$

$$A_2 = A_{m2} \exp\{-[(\phi-\phi_2)^2/0/72B^2_{h2}] = [a \tan(h_2/r)^2/0.72B^2_{v2}\} \quad (2)$$

where:

$\phi_1$ and $\phi_2$ are the central angle corresponding to the antennas' boresight;

$\phi$ is a current angle of arrival relative to the boresight;

$B_{h1}$ and $B_{h2}$ are the 3 db beamwidth of the horizontal antenna pattern;

$B_{v1}$ and $B_{v2}$ are the 3 db beamwidth of the vertical antenna pattern;

$A_{m1}$ and $A_{m2}$ are the ultimate attenuations of the antennas with heights $h_1$ and $h_2$, respectively; and r is a distance between the base station and the remote unit.

The amplitude ratio calculated in the AOA computer 209 for identical antenna parameters (Bh1=Bh2, Bv1=Bv2, Am1=Am2) may be written as:

$$A_1/A_2 = \exp\{-[(\phi-\phi_1)^2/0/72B^2_h] + (\phi-\phi_2)^2/0/72B^2_h\} \quad (3)$$

from which:

$$\phi = \{[0.36B^2_h \ln(A_1/A_2)]/(\phi_1-\phi_2)\} + 0.5(\phi_1+\phi_2)] \quad (4)$$

Equation (4) is the AD-AOA transfer function of the adjacent sectors antennas with the horizontal patterns beamwidth $B_h$, the angular diversity $(\phi_1-\phi_2)$ and the equal gain azimuth angle $0.5(\phi_1+\phi_2)$.

The AOA estimation error due to the errors in the amplitude A1 and A2 estimation can be derived as a differential operation, which results in:

$$d\phi = S_o d(A_1/A_2)/(A_1/A_2) \quad (5)$$

where So=0.36 $B^2_h/(\phi_1-\phi_2)$. For small values of errors, differentiation can be replaced by a difference, which yields an upper bound on the AOA error as a function of the relative errors of the amplitude estimation $\Delta A_1/A_1$ and $\Delta A_2/A_2$ in the location equipment of the two adjacent sectors, respectively:

$$\Delta\phi <= \{|\Delta A_1/A_1| + |\Delta A_2/A_2|\}/0.36B^2_h(\phi_1-\phi_2). \quad (6)$$

In general to evaluate AOA estimation accuracy it is necessary to treat $\Delta\phi$ as a stochastic error with variance:

$$\text{Var}(\Delta\phi) = S_o\{\text{var}(\Delta A_1/A_1) + \text{var}(\Delta A_2/A_2) - 2R_{12}[\text{var}(\Delta A_1/A_1) \text{ var}(\Delta A_2/A_2)]^{0.5}\} \quad (7)$$

where $R_{12}$ is the correlation coefficient of the random variables $\Delta A_1/A_1$ and $\Delta A_2/A_2$, which depends on the correlation signals in the two angular diversity antennas with small space separation. For $R_{12} \neq 0$ the phenomenon of mutual amplitude errors compensation occurs resulting in decrease in the AOA error.

Figure 3:
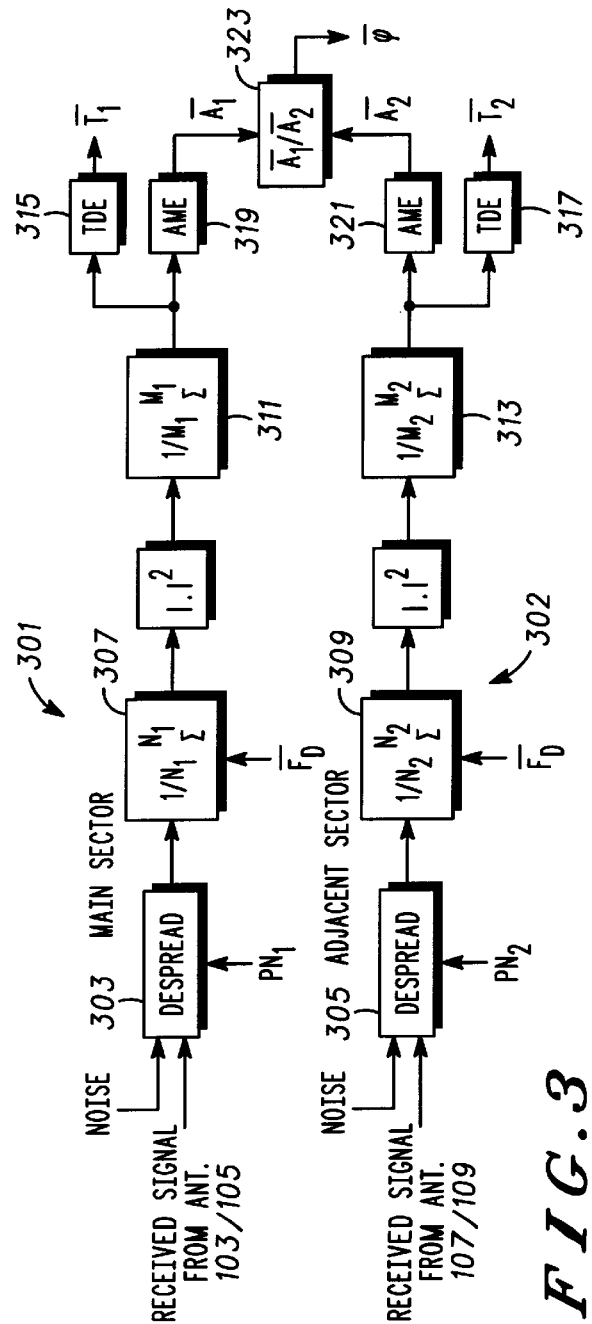
FIG. 3 is a block diagram illustration of a communication system incorporating a modified location searcher.

FIG. 3 illustrates a first modification to the location searcher shown in FIG. 2 and described above. The main sector location searcher 301 and the adjacent sector location searcher 302 work in two phases. The signals received from the main sector antennas 103/105 and the adjacent sector antennas 107/109 are despread 303,305 and coherently averaged 307,309 over $N_1$ and $N_2$ Walsh symbols, respectively. An estimate of the maximum Doppler frequency is used to determine appropriate values for the coherent averaging window $N_{opt1}$ and $N_{opt2}$, respectively, which are used for coherent averaging. In a second stage, the signals are respectively non-coherently averaged 311, 313 over $M_1$ and $M_2$ averaging periods, respectively. These procedures are done for several time offsets of the dispreading PN sequences separated by one eighth of a chip period to build a power delay profile (PDP) with the results being retain in a memory (not depicted).

From the memory, the time-delay estimators 315 and 317 and amplitude estimators 319 and 321 select the maximum of the PDPs and assign the time offset and square root values of these offsets to the time of arrival ($T_1$ and $T_2$) and signal amplitude ($A_1$ and $A_2$) estimates, respectively. The estimates are then fed to the AOA computer 323, which forms the ratio $A_1/A_2$ and the AOA estimate $\phi = S_o(A_1/A_2)$.

This technique, however, is not able to resolve the prompt ray in the main or the adjacent sectors and requires very long total integration time for the adjacent sector ($N_{opt2}*M_2 >> N_{opt1}*M_1$) due to the low input SNR. Thus, the accuracy of the AOA estimation leaves much to be desired.

Figure 4:
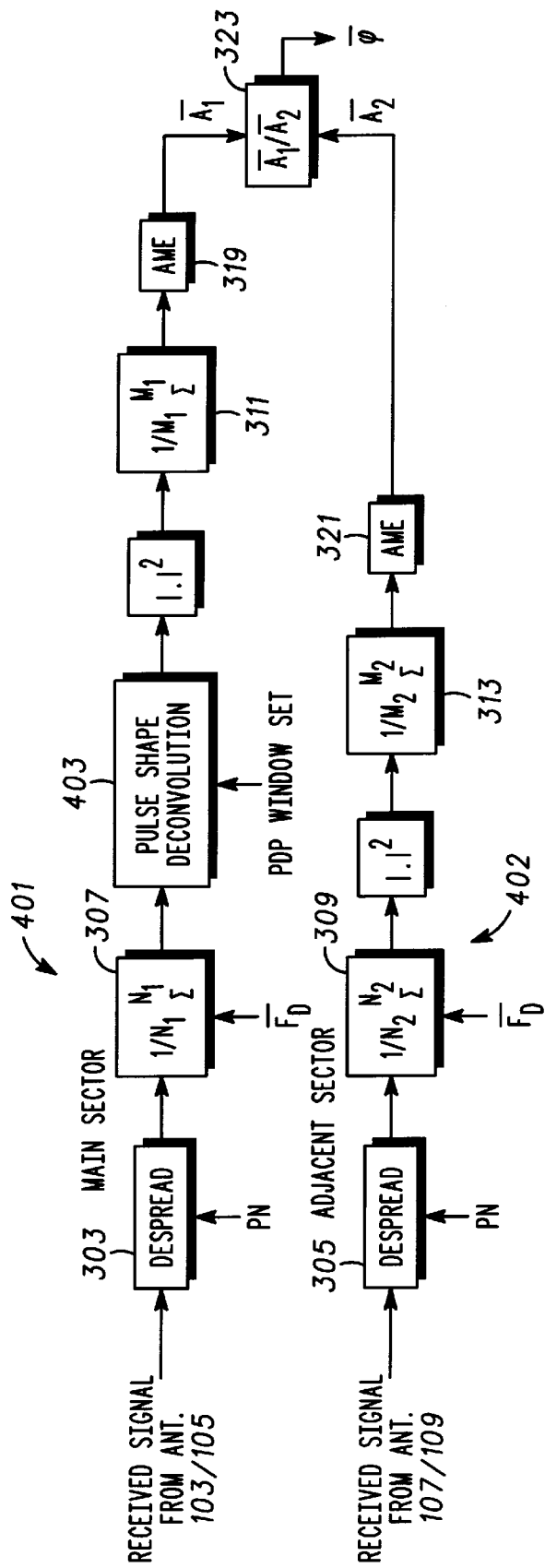
FIG. 4 is a block diagram illustration of a communication system incorporating a further modified location searcher.

FIG. 4 illustrates a main sector location searcher 401 and an adjacent sector location searcher 402. The location searchers 401 and 402 are identical to location searchers 301 and 302, and like reference numerals are used to depict like elements, with the exception that the main sector location searcher 401 further includes a deconvolver 403.

The location searcher 401 produces a PDP using the technique described above with respect to FIG. 3. Using this PDP a new window is formed around its peak (i.e., Wc=2Tc). The received signal from the main sector antennas 103/105 is despread for the time offset in the window Wc and then integrated coherently 307, deconvolved 403 with the known pulse shape and non-coherently integrated 311. The deconvolution 403 is carried out after the coherent integration process 307 where the SNR has been enhanced significantly (14–21 db for maximum Doppler frequency range from 80 Hz–100 Hz). Thus, location searcher 401 is able to resolve sub-chip spaced rays and achieve high precision estimation of the prompt ray time-delay $T_1$ and amplitude $A_1$.

However, the location searcher 402 does not use a deconvolver to produce the amplitude estimate $A_2$ of the peak ray (maximum PDP) due to the low input SNR. Thus, the errors of the amplitude and final AOA estimates are not decreased significantly as compared to the technique described in connection with FIG. 3.

Figure 5:
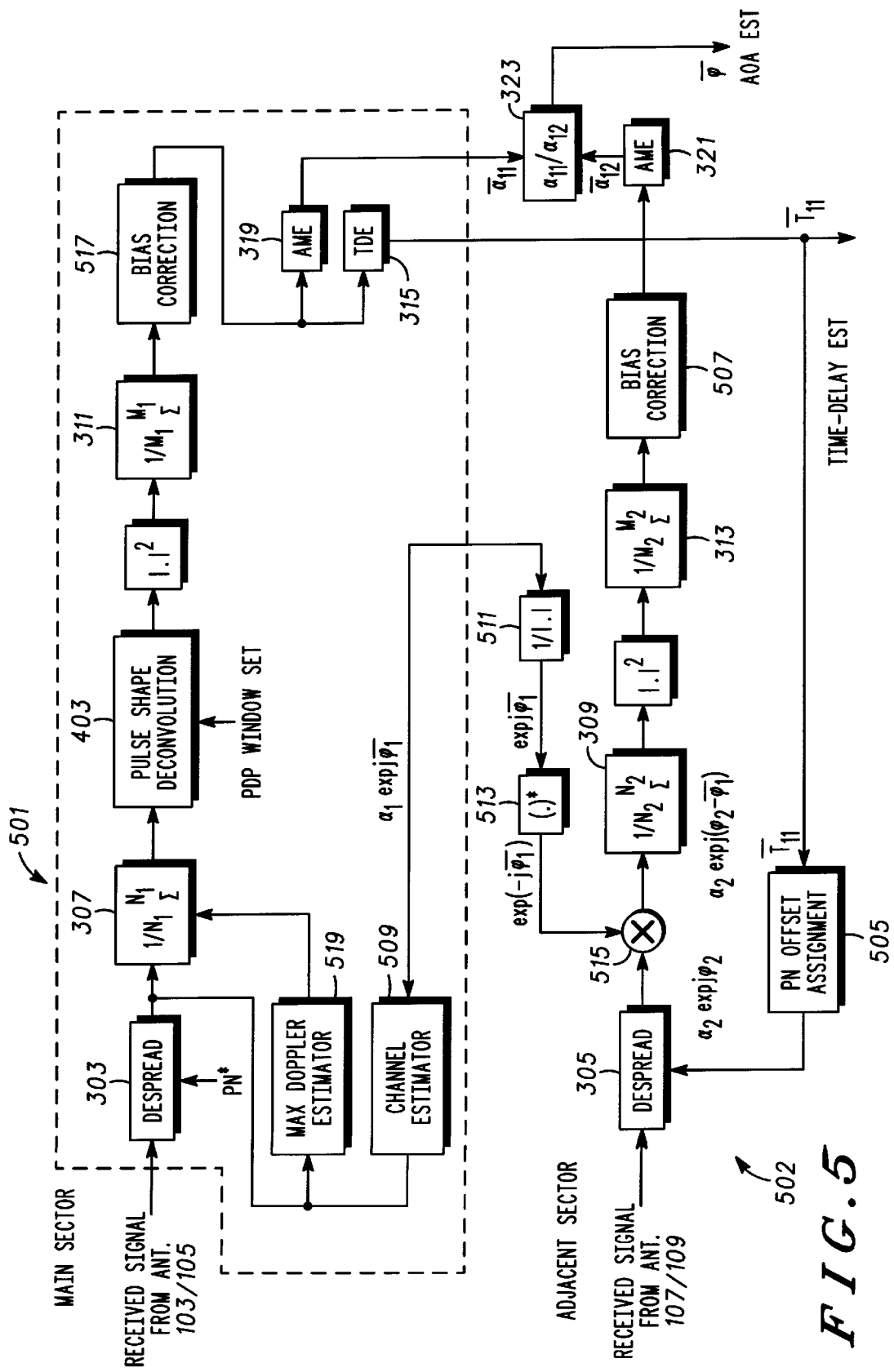
FIG. 5 is a block diagram illustration of a communication system incorporating a location searcher adapted in accordance with a preferred embodiment of the present invention.

FIG. 5 illustrates a main sector location searcher 501 and an adjacent sector location searcher 502. It will be appreciated that the location searchers 501 and 502 may be implemented as software on magnetic or optical media, firmware, a programmable gate array and/or an application specific integrated circuit without departing from the fair scope of the invention. In accordance with a preferred embodiment of the invention, high precision parameters estimates obtained from results of the main sector location searcher 501 calculations are used to aid the adjacent sector location searcher 502. This can be accomplished because of the high signal correlation between the main sector antennas 103/105 and the adjacent sector antennas 107/109. This is especially true where the separation is small, for example, approximately 1 m for a typical cellular tower top antenna configuration. The location searcher 501 estimates the time-delay and amplitude using the techniques described in connection with FIG. 4, and like reference numeral are again used to identify like elements between FIGS. 3, 4 and 5. The location searcher 501 further includes a max Doppler estimator 519 coupled to the despreader 303 for providing an estimate coherent averaging window for coherent averaging 307.

Assuming a two ray multipath channel, the PDP observed by the location searcher 501 can be expressed as $$PDP_1 = \alpha^2_{11} a(\tau - \tau_{11}) + \alpha^2_{21} a(\tau - \tau_{21}) \quad (8)$$

Where $\alpha_{11}, \tau_{11}$, and $\alpha_{21}$ and $\tau_{21}$ ($\tau_{11} < \tau_{21}$) are the amplitudes and time-delays of the prompt and peak rays in the main sector antennas 103/105, and $a(\tau)$ is the impulse response of the chip pulse-shaping filters. Due to the deconvolution provided by the deconvolver 403, the location searcher 501 is able to resolve the prompt ray and achieve high precision estimation for the parameters $\tau_{11}$ and $\alpha_{11}$. The location searcher 502 observes the PDP $$PDP_2 = \alpha^2_{12} a(\tau - \tau_{12}) + \alpha^2_{22} a(\tau - \tau_{22}) \quad (9)$$

where $\alpha_{12}, \tau_{12}$, and $\alpha_{22}, \tau_{22}$ are the amplitudes and time-delays of the prompt and peak rays in the adjacent sector antennas 107/109.

Figure 6:
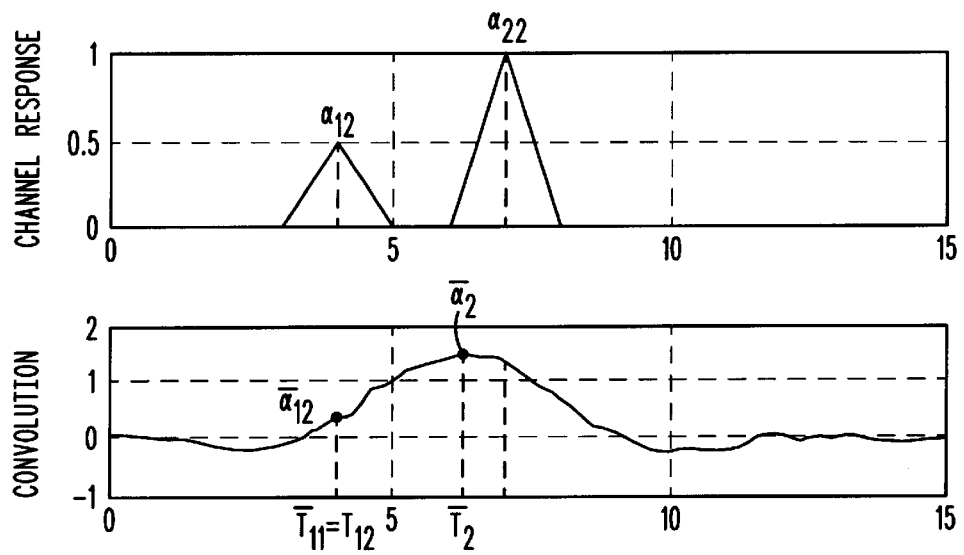
FIG. 6 illustrates several plots depicting convolution and non-convolution channel outputs.
Figure 7:
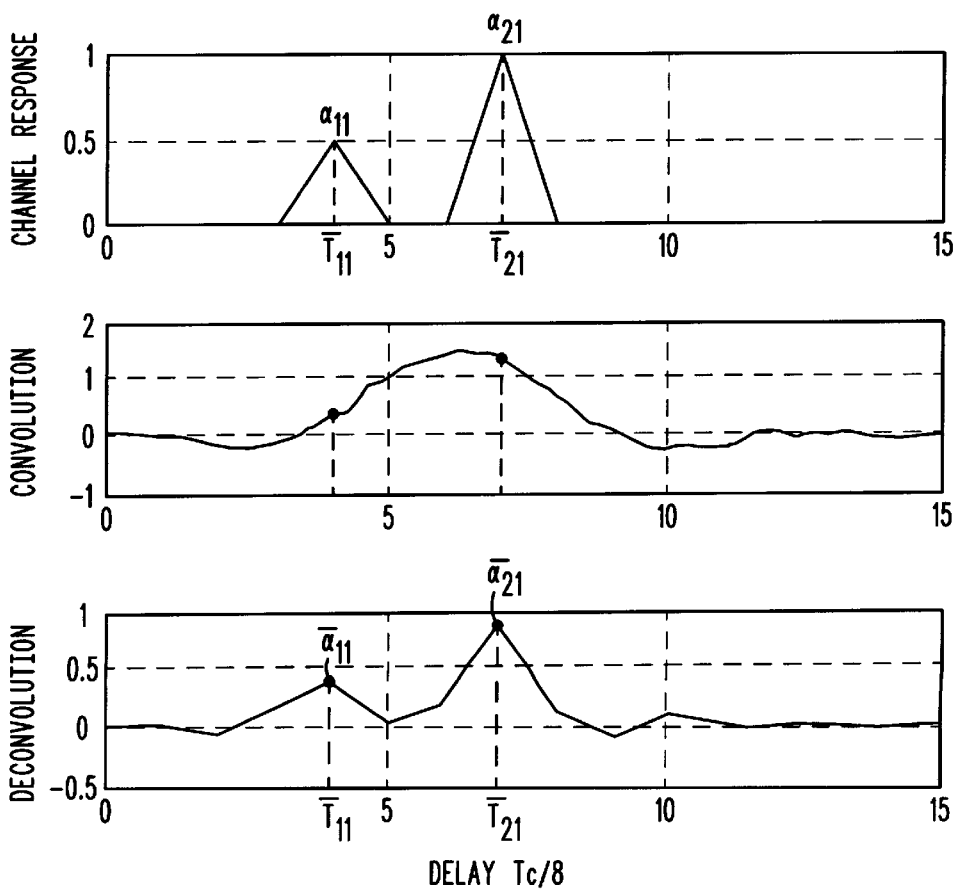
FIG. 7 illustrates several plots depicting convolution and non-convolution channel outputs.

It is not possible to resolve and estimate the prompt ray parameters $\alpha_{12}$ and $\tau_{12}$ for $|\tau_{22} - \tau_{12}| < T_c$ without the operation of a deconvolver, which can not be implemented in the adjacent sector location searcher because of the low input SNR. Thus, the location searcher 502 produces estimates $\alpha_2$ and $\tau_2$ whose values are closer to the actual parameters of the peak ray $\alpha_{22}$ and $\tau_{22}$ than the actual parameters of the prompt ray $\alpha_{12}$ and $\tau_{12}$. This is illustrated in the plots shown in FIG. 6 and FIG. 7, wherein the estimate $\alpha_2$ and $\tau_2$ are more closely aligned with the actual parameters of the peak ray $\alpha_{22}$ and $\tau_{22}$.

In order to reduce the amplitude estimation error, the location searcher 502 observes only one value of the PDP$_2$ corresponding to the unknown prompt ray time-delay $\tau_{12}$ using the location searcher 501 estimation $\tau_{11}$. Due to small separation between the main and adjacent sector antennas, $\tau_{11}$ is close to $\tau_{12}$ and therefore, $\tau_{11}$ can be used as an estimate to assign the time offset for dispreading the received signal in the location searcher 502. In this regard, the estimate $\tau_{11}$ is fed to a PN offset assignor 505 in the location searcher 502, which assigns a Walsh symbol duration to the despreader 305. After dispreading 305, averaging 309 and 313 and bias correction 507, location searcher 502 produces an estimate $\alpha_{12}$, which is close to the actual amplitude $\alpha_{12}$ of the prompt ray without its extraction from the total PDP.

The location searcher 501 includes a channel estimator 509 that generates a phase estimation result $\phi_1$, and this phase estimation is used to increase the coherent averaging window $N_{opt2}$ resulting in increased SNR processing gain and hence in increased accuracy of the amplitude estimation in the location searcher 502. The dispreading signals plus noise at the location searcher 501 and the location searcher 502, respectively, can be written $$x_1(t) = \alpha_1(t) \exp j\phi_1(t) + n_1(t) \quad (10)$$

$$x_2(t) = \alpha_2(t) \exp j\phi_2(t) + n_2(t) \quad (11)$$

The channel estimation results from the location searcher 501, after amplitude fluctuation suppression 511 and conjugation operation 513, is multiplied with the dispreading signal in the location searcher 502 by multiplier 515. The product can be written $$x_3(t) = x_2(t) x'_1(t) = \alpha_2(t) \exp j(\phi_2 - \phi_1) + n'_2(t). \quad (12)$$

Due to typically small separation between the main sector antennas 103/105 and the adjacent sector antennas 107/109 and high correlation between x1(t) and x2(t), $\phi_2 \approx \phi_1$ and as result phase rotation may be removed from equation (12) yielding $$x_3(t) \approx \alpha_2(t) + n'_2(t). \quad (13)$$

Figure 8:
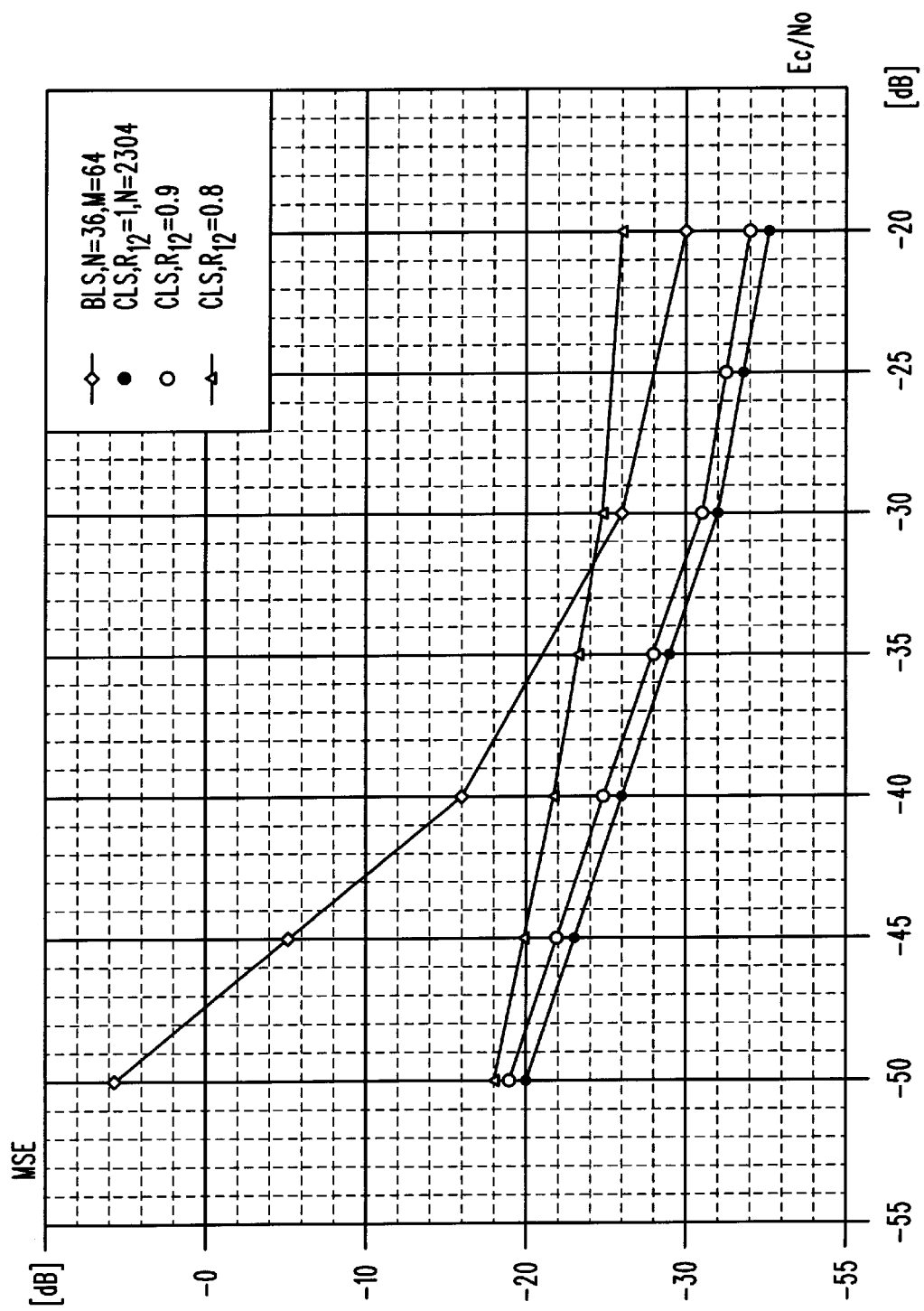
FIG. 8 illustrates the improvement in the amplitude estimation accuracy as a function of SNR.

Therefore, the coherent averaging window can be increased as compared to that used by location searcher 501 (Nopt2>>Nopt1). This is referred to as quasi-coherent averaging. After coherent averaging 309 and non-coherent averaging 313 with a small window ($M_2 << M_1$) and bias correction 507, location searcher 502 produces an amplitude estimate $\alpha_2$ with high precision. The plots in FIG. 8 illustrate the improvement in the amplitude estimation accuracy as a function of SNR. For a given value of the mean-squared error, for example −28 dB, and the correlation coefficient between $x_1(t)$ and $x_2(t)$ R12=0.9, the location searcher 502, using only coherent averaging (N=2304), requires about 10 dB less input SNR than a location searcher with dual coherent (N=36) and non-coherent (M=64) configuration. For given SNR=−30 dB (a typical ratio for the adjacent sector) and R12=0.9, the location searcher 502, again using only coherent averaging, provides about 5 dB less mean-squared error of the amplitude estimation than a location searcher with a dual averaging algorithm and the same total sample integration period.

While the invention has been particularly shown and described with reference to several preferred embodiments, it will be understood by those skilled in the art that various changes in form and details may be made therein without departing from the spirit and scope of the invention, and it is intended that all such changes come within the scope of the following claims.

We claim:

1. A method of determining an angle of arrival in a transmitted signal in a communication system, the method comprising the steps of:

receiving a transmitted signal at a main sector and an adjacent sector of the communication system;

determining a first parameter suitable for location determination from the signal received at the main sector;

using the first parameter to determine a second parameter suitable for location determination from the signal received at the adjacent sector to reduce an amplitude estimation error; and using the second parameter to determine the angle of arrival.

2. The method of claim 1, wherein one of the first parameter and the second parameter are estimated values.

3. The method of claim 1, wherein the first parameter is one of a time-delay estimate and a channel phase estimate.

4. The method of claim 1, wherein the step of using the first parameter comprises using the first parameter to determine a coherent averaging window.

5. The method of claim 1, wherein the first parameter is determined in a main sector portion of the communication system and the second parameter is determined in an adjacent sector portion of the communication system, the first parameter being communicated from the main sector portion to the adjacent sector portion.

6. An apparatus for determining an angle-of-arrival of a signal transmitted in a communication system comprising:

a main sector having a main sector receiver coupled to a main sector antenna and a main sector location searcher coupled to the main sector receiver;

an adjacent sector having an adjacent sector receiver coupled to an adjacent sector antenna and an adjacent sector location searcher coupled to the adjacent sector receiver; and wherein the main sector location searcher is coupled to the adjacent sector location searcher for communicating at least one parameter suitable for use in location determination from the main sector location searcher to the adjacent sector location searcher, and wherein the adjacent sector location searcher is operable to use the at least one parameter for determining the angle-of-arrival and wherein the at least one parameter comprises one of a time-delay estimate and a channel phase estimate.

7. The apparatus of claim 6, wherein a time-delay estimator portion of the main sector location searcher is coupled to a coherent averaging window assignor portion of the adjacent sector location searcher.

8. The apparatus of claim 6, wherein the adjacent location searcher comprises a multiplier and wherein and channel estimator portion of the main sector location searcher is coupled to the multiplier.

9. A computer program embodied on a computer readable medium for determining an angle of arrival of a signal transmitted in a communication system comprising:

a first routine to determine a first parameter from a signal received at a main sector antenna of the communication system;

a second routine using the first parameter to determine a second parameter from the signal as received at an adjacent sector antenna of the communication system, wherein the second parameter comprises an amplitude estimate; and a third routine using the second parameter to determine the angle of arrival of the signal.

10. The computer program of claim 9, further comprising a fourth routine to determine a coherent averaging window from the first parameter.

11. The computer program of claim 9, wherein the first parameter comprises one of a time-delay estimate and a channel phase estimate.

12. The computer program of claim 9, wherein the first routine is contained within a main sector portion of the communication system and the second routine is contained within an adjacent sector portion of the communication system.

13. The computer program of claim 9, wherein the computer readable media comprises one of the group of media consisting of software on magnetic media, software on optical media, firmware, a programmable gate array and an application specific integrated circuit.

* * * * *